United States Patent [19]

Watanabe et al.

[11] 4,384,694
[45] May 24, 1983

[54] ROCKET ATTITUDE CONTROL APPARATUS

[75] Inventors: Yasushi Watanabe, Kawagoe; Teruo Fujiwara, Houya; Kunio Shimano, Kawagoe, all of Japan

[73] Assignee: Nissan Motor Company, Limited, Kanagawa, Japan

[21] Appl. No.: 171,466

[22] Filed: Jul. 23, 1980

[30] Foreign Application Priority Data

Aug. 3, 1979 [JP] Japan .................................. 54-99344

[51] Int. Cl.³ ............................................ F42B 15/18
[52] U.S. Cl. .................................. 244/3.22; 60/231; 239/127.3; 239/265.23
[58] Field of Search ................. 244/3.21, 3.22; 60/231; 239/127.3, 265.23

[56] References Cited

U.S. PATENT DOCUMENTS

| | | | |
|---|---|---|---|
| 3,020,714 | 2/1962 | Eggers et al. | 60/231 |
| 3,128,602 | 4/1964 | Salemka | 60/231 |
| 3,182,450 | 5/1965 | Wedell et al. | 60/231 |
| 3,300,978 | 1/1967 | Pennington | 60/231 |
| 3,318,532 | 5/1967 | Gaubatz | 60/231 |
| 3,465,966 | 9/1969 | Fuentes et al. | 239/265.23 X |
| 3,568,954 | 4/1966 | McCorkle, Jr. | 244/3.22 |
| 3,926,390 | 12/1975 | Teuber et al. | 244/3.22 |

*Primary Examiner*—Harold J. Tudor

[57] ABSTRACT

For controlling the attitude of a rocket including a rocket fuselage and a thrust nozzle integrally attached to the rear end of the rocket fuselage and having a nozzle throat located longitudinally intermediate thereof, a rocket attitude control apparatus comprises a plurality of thrust vector control units disposed at the outer periphery of the thrust nozzle between the nozzle throat and the rear end of the thrust nozzle in circumferentially equiangularly spaced relationship to each other, and each including a fluid injecting nozzle projectable and retractable into and out of the thrust nozzle and having an injecting bore therein, wherein said fluid injecting nozzle is permitted to project into the thrust nozzle while being cooled by fluid injected from the injecting bore into the thrust nozzle. The projection of the fluid injecting nozzle causes a stream of combustion gas passing through the thrust nozzle to be partially disturbed for controlling the attitude of the rocket.

11 Claims, 3 Drawing Figures

ROCKET ATTITUDE CONTROL APPARATUS

FIELD OF THE INVENTION

The present invention relates to a rocket attitude control apparatus, and more particularly to an apparatus for controlling the attitude of a rocket by controlling the thrust vector of the rocket on flight.

DESCRIPTION OF THE PRIOR ART

Conventionally, there have been proposed and known a wide variety of apparatus such as for example those of the jet tab type and the secondary jet type. The former type apparatus comprises a plurality of tabs rotatably supported on the rear end of a thrust nozzle in circumferentially equiangularly spaced relationship to each other wherein the tabs are selectively rotated to project into the stream of a combustion gas passing through the thrust nozzle and thereby to obstruct a portion of the stream for controlling the thrust vector of the rocket. The secondary jet type apparatus comprises a plurality of thrust vector control units mounted on the thrust nozzle in circumferentially equiangularly spaced relationship to each other wherein the thrust vector control units are selectively operated to inject fluid into the thrust nozzle so that the combustion gas passing therethrough is caused to change its direction of flow, so as to control the thrust vector of the rocket. in the jet tab type apparatus, various problems are encountered in practical use since it is extremely difficult to select a proper metal material for the tabs because the tabs are exposed to the hot combustion gas, although an excellent thrust vector control efficiency can be accomplished against a relatively large degree of disturbance of air. In the secondary jet type apparatus, such a high thrust vector control efficiency can not be expected against the relatively large degree of disturbance, and there is a possibility that the fluid to be injected may be used up when the rocket meets with an unexpected disturbance of air during flying since the amount of the fluid to be stored in the rocket is limited.

STATEMENT OF THE OBJECTS OF THE INVENTION

It is therefore a primary object of the present invention to provide a rocket attitude control apparatus which overcomes the foregoing shortcomings and can properly control the attitude of the rocket against a large degree of disturbance of air.

It is another object of the present invention to provide a rocket attitude control apparatus which allows ease of selection of the metal material for injecting nozzles to be used in the rocket attitude control apparatus of the present invention.

SUMMARY OF THE INVENTION

The above objects of the present invention is accomplished by a rocket attitude control apparatus for controlling the attitude of a rocket including a rocket fuselage and a thrust nozzle integrally attached to the rear end of the rocket fuselage and having a nozzle throat located longitudinally intermediate thereof, the apparatus comprising a plurality of thrust vector control units disposed at the outer periphery of the thrust nozzle between the nozzle throat and the rear end of the thrust nozzle in circumferentially equiangularly spaced relationship to each other, and each including a fluid injecting nozzle projectable inwardly of the thrust nozzle and having an injecting bore therein, a casing accommodating the fluid injecting nozzle therein, reciprocating means for projecting and retracting the fluid injecting nozzle into and out of the thrust nozzle, a fluid reservoir for reserving fluid to be injected from the injecting bore of the fluid injecting nozzle, a fluid passageway leading from the fluid reservoir to the injecting bore of the fluid injecting nozzle, valve means disposed in the fluid passageway for controlling the amount of the fluid passing therethrough to the injecting bore from the fluid reservoir, and valve operating means for closing and opening the valve means.

BRIEF DESCRIPTION OF THE DRAWINGS

The features and advantages of a rocket attitude control apparatus according to the present invention will be more clearly understood from the following detailed description taken in conjunction with the accompanying drawings, in which.

DESCRIPTION OF THE PREFERRED EMBODIMENT

Figure 1:
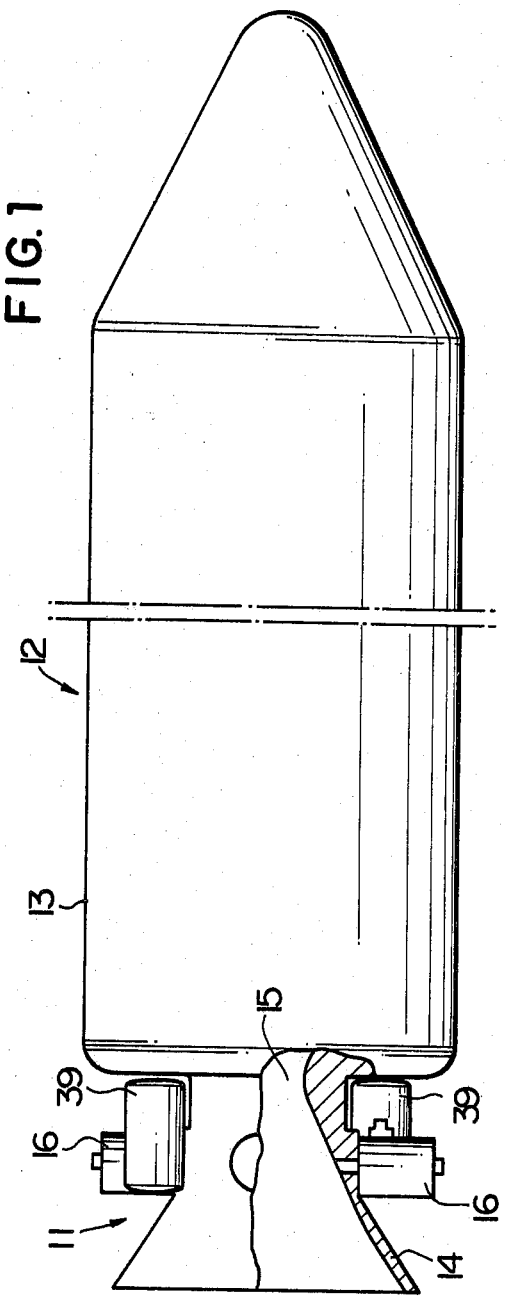
FIG. 1 is a side view showing, in a partial cross section, of a rocket which is provided with a rocket attitude control apparatus according to the present invention.
Figure 2:
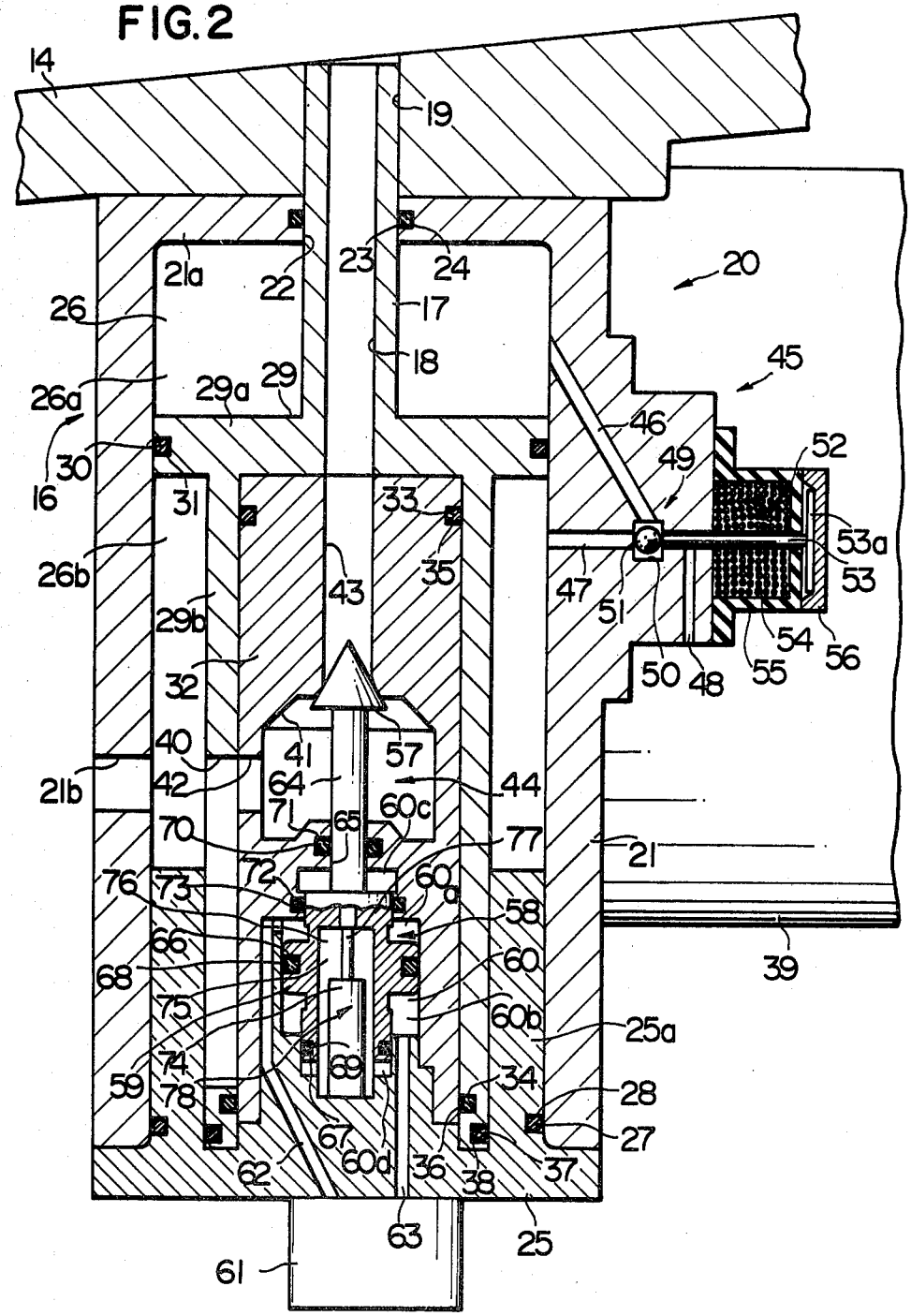
FIG. 2 is a cross sectional view of a thrust vector control unit mounted on the thrust nozzle of the rocket.

Referring now to the drawings, and in particular to FIGS. 1 and 2, a rocket attitude control apparatus embodying the present invention is generally indicated at 11. The apparatus 11 is adapted to control the attitude of a rocket 12 which includes a rocket fuselage 13 and a thurst nozzle 14 integrally attached to the rear end of the rocket fuselage 13 and having a nozzle throat 15 which is located longitudinally intermediate thereof. The apparatus 11 comprises a plurality of thrust vector control units, generally denoted at 16, which are disposed at the outer periphery of the thrust nozzle 14 between the nozzle throat 15 and the rear end of the thrust nozzle 14 in circumferentially equiangularly spaced relationship to each other. Each of the thrust vector control units 16 comprises a fluid injecting nozzle 17 having an injecting bore 18 therein and slidably received in each of radial bores 19 which are formed in the thrust nozzle 14 in opposing relationship to the thrust vector control units 16 so that the fluid injecting nozzle 17 is projectable inwardly of the thrust nozzle 14. A casing designated in its entirety at 20 comprises a stationary cylinder 21 which has an end wall 21a in which is formed a cylinder bore 22 in coaxial relationship to the injecting bore 18 so that the casing 20 accommodates the fluid injecting nozzle 17 therewithin. An elastic O-ring 23 is received in an annular groove 24 formed in the end wall 21a to hermetically seal the fluid injecting nozzle 17 against the end wall 21a. The casing 20 further comprises a plug 25 which closes the stationary cylinder 21 at its axially outer end to define a cylinder chamber generally designated at 26. The plug 25 has a cylindrical body portion 25a projecting toward the thrust nozzle 14 and into the cylinder chamber 26 and hermetically sealed against the stationary cylinder 21 by an elastic O-ring 27 which is received in an annular groove 28 formed in the body portion 25a of the plug 25. An outer piston 29 comprises a piston member 29a integrally formed with the fluid injecting nozzle 17 and slidably housed in the stationary cylinder 21 to divide the cylinder chamber 26 into a first cylinder compartment 26a adjacent to the thrust nozzle 14 and a second cylinder compartment 26b remote from the thrust nozzle 14. The piston member 29a is hermetically sealed against the stationary cylinder 21 by an elastic O-ring 30 which is received in an annular groove 31 formed in the piston member 29a. A guide member 32 is secured to the plug 25 to extend into the second compartment 26b of the cylinder chamber 26 from the end wall portion of the plug 25 and is radially spaced apart inwardly from the body portion 25a of the plug 25. The outer piston 29 further comprises a cylindrical body portion 29b which is in slidable engagement with and hermetically sealed against the guide member 32. Hermetic sealing is provided by two elastic O-rings 33 and 34 one of which is received in an annular groove 35 formed in the guide member 32 and the other of which is received in an annular groove 36 formed in the cylindrical body portion 29b of the outer piston 29. The body portion 29b is also in slidable engagement with and hermetically sealed against the body portion 25a of the plug 25 by an elastic O-ring 37 which is received in an annular groove 38 formed in the body portion 29b of the outer piston 29.

A fluid reservoir 39 for reserving fluid such as a pressurized gas of Freon which is a trademark of E. I. Du Pont de Nemours & Co. is securely mounted on the thrust nozzle 14 to supply the fluid to be injected from the injecting bore 18 of the fluid injecting nozzle 17. In the stationary cylinder 21 of the casing 20 is formed a radial hole 21b which provides communication between the fluid reservoir 39 and the second cylinder compartment 26b of the cylinder chamber 26. An axial slot 40 is formed in the body portion 29b of the outer piston 29 and communicates with the second cylinder compartment 26b of the cylinder 26. The guide member 32 is formed with a valve cavity 41, an inlet port 42 providing communication between the axial slot 40 and the valve cavity 41, and an outlet port 43 providing communication between the valve cavity 41 and the injecting bore 18 of the fluid injecting nozzle 17. The radial hole 21b, second cylinder compartment 26b, axial slot 40, valve cavity 41, inlet port 42 and outlet port 43 constitute as a whole a fluid passageway leading from the fluid reservoir 39 to the injecting bore 18 of the fluid injecting nozzle 17 as indicated generally at 44.

The outer piston 29 forms part of reciprocating means 45 for projecting and retracting the fluid injecting nozzle 17 into and from the nozzle structure 14. The reciprocating means 45 further comprises a first control passageway 46 formed in the stationary cylinder 21 of the casing 20 and leading into the first cylinder compartment 26a of the cylinder chamber 26, a second control passageway 47 also formed in the stationary cylinder 21 of the casing 20 and leading into the second cylinder compartment 26b of the cylinder chamber 26, and a third control passageway 48 which is also formed in the stationary cylinder 21 of the casing 20 and which is vented to the open air. A valve assembly 49 comprises a valve chamber 50 formed in the stationary cylinder 21 of the casing 20 and disposed to associate with all of the first, second and third control passageways 46, 47 and 48. Freely movably housed in the valve chamber 50 is a spherical valve member 51 which serves to selectively provide and block the communication between said first and second control passageways 46 and 47 and between the first and third control passageways 46 and 48. A solenoid-operated valve 52 comprises a push rod 53 projectable into and retractable from the valve chamber 50, a solenoid coil 54 mounted on the stationary cylinder 21 of the casing 20 to slidably receive the push rod 53, and a disc 53a integrally connected to the push rod 53 so that the push rod 53 can be projected into the valve chamber 50 upon energization of the solenoid coil 54 and can be retracted from the valve chamber 50 upon de-energization of the solenoid coil 54. The projection and retraction of the push rod 53 causes the spherical valve member 51 to move toward and away from the second cylinder compartment 26b so that the second control passageway 47 is closed when the first control passageway 46 is allowed to communicate with the third control passageway 48 and that the third control passageway 48 is closed by the pressure of the fluid in the second cylinder compartment 26b when the first control passageway 46 is allowed to communicate with the second control passageway 47. An insulator cover 55 is secured to the stationary cylinder 21 of the casing 20 to cover the solenoid coil 54 and the push rod 53, with a cap 56 attached to the outer face of the insulator cover 55.

Valve means comprises a tapered valve heat 57 housed in the valve cavity 41 which is disposed longitudinally intermediate of the fluid passageway 44 so that fluid is injected from the injecting bore 18 of the fluid injecting nozzle 17 and cools the fluid injecting nozzle 17 at least when the reciprocating means 45 is operated to cause the fluid injecting nozzle 17 to project inwardly of the thrust nozzle 14. On the other hand, the valve head 57 is maintained closed when fluid is not required to be injected from the injecting bore 18 of the fluid injecting nozzle 17.

Valve operating means generally indicated at 58 for closing and opening the valve head 57 comprises an inner piston 59 slidably received in a cylinder concavity 60 defined by the guide member 32 and the plug 25. The inner piston 59 divides the cylinder concavity 60 into two separate compartments 60a and 60b, the former of which is in communication with a servo valve 61 through a fluid passageway 62 formed in the guide member 32 and the plug 25, and the latter of which is also in communication with the servo valve 61 through another fluid passageway 63 formed in the plug 25. Between the axially inner end of the inner piston 59 and the guide member 32 is formed a confined chamber 60c which is vented to the open air. Another confined chamber 60d is also formed between the axially outer end of the inner piston 59 and the plug 25 to be vented to the open air. The servo valve 61 is in communication with a suitable hydraulic source unit (not shown) for receiving fluid therefrom. The inner piston 59 is rigidly connected to the valve head 57 through a stem 64 which is slidably received in a stem bore 65 formed in the guide member 32. The inner piston 59 has wall portions in which are formed to annular grooves 66 and 67 in which elastic O-rings 68 and 69 are respectively received to hermetically seal the inner piston 59 and the guide member 32 against each other. An elastic O-ring 70 is received in an annular groove 71, formed in the guide member 32, to hermetically seal the stem 64 against the guide member 32. Another elastic O-ring 72 is received in another annular groove 73, also formed in the guide member 32, to hermetically seal the inner piston 59 against the guide member 32. A solenoid coil 74 is accommodated within a chamber 75, which is defined by the plug 25 and an axial bore 76 formed in the inner piston 59, to slidably receive a solenoid plunger 77 secured to the axially inner end wall of the axial bore 76. Fluid is thus selectively fed and discharged into and from the compartments 60a and 60b of the cylinder concavity 60 through the fluid passageways 62 and 63 respectively so that the valve head 57 is opened and closed depending upon the axial position of the valve head 57 which is moved with respect to the guide member 32. The axial position of the valve head 57 is detected by the solenoid coil 74 and the solenoid plunger 77 through the inner piston 59 and the stem 64. The solenoid coil 74 and the solenoid plunger 77 constitute in combination a position detector generally designated at 78.

Figure 3:
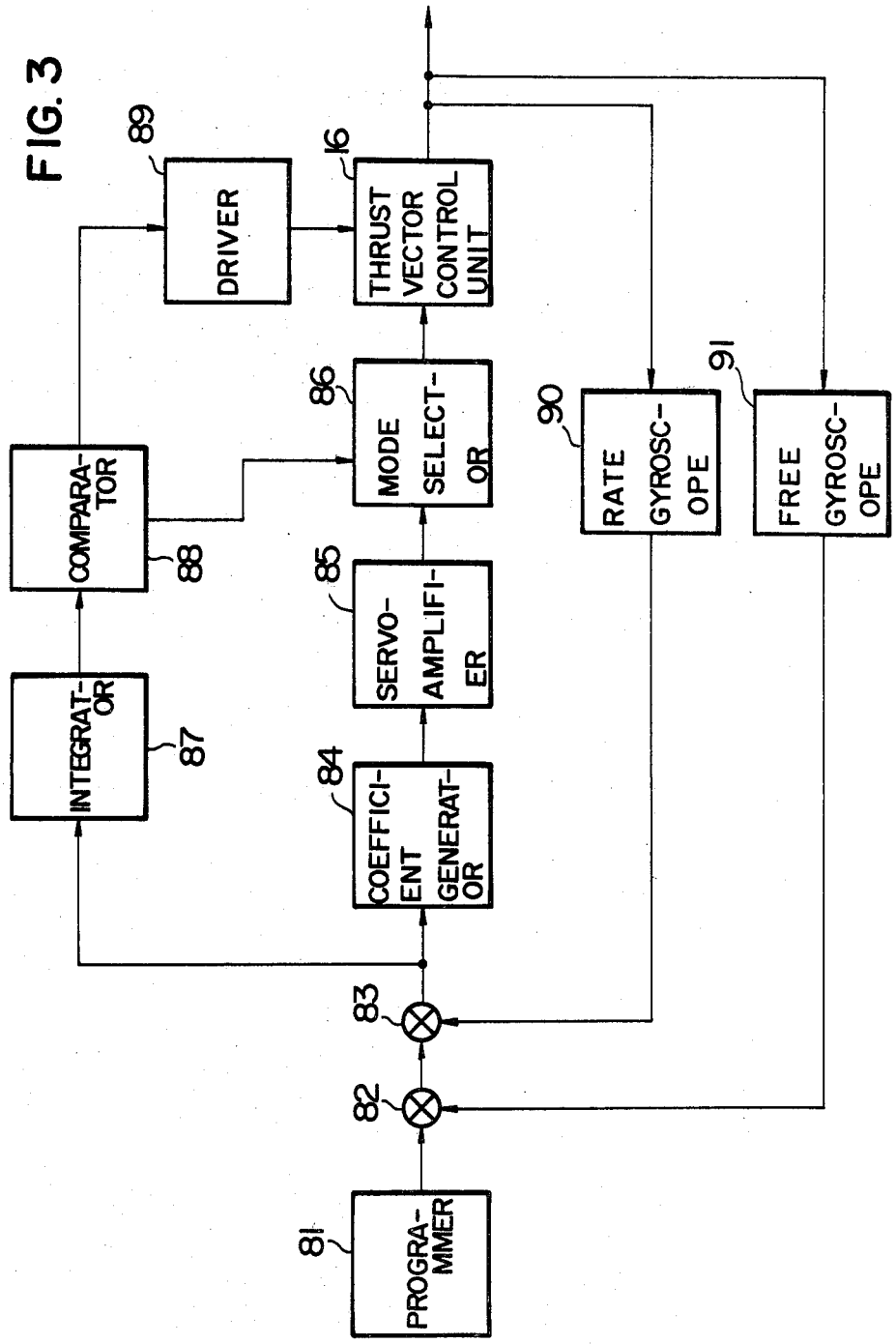
FIG. 3 is a block diagram showing a control circuit for controlling the attitude of the rocket on flight.

In FIG. 3 is shown a control circuit which comprises a programmer 81 which successively supplies control reference signals to two adders 82 and 83 on the basis of a predetermined program for the attitude of the rocket 12 on flight, and a coefficient generator 84 which calculates a correction coefficient on the basis of the signals from the adder 83 to deliver signals to a servo-amplifier 85. A mode selector 86 determines a mode of operation on the basis of the signals passed through the servo-amplifier 85 to transmit mode signals to the servo valve 61 of each of the thrust vector control units 16 and to adjust the amount of the fluid to be injected from the fluid injecting nozzle 17. An integrator 87 receives and integrates the signals from the adder 83. A comparator 88 compares the output signals from the integrator 87 with an estimated value of the disturbance to output signals to the solenoid-operated valve 52 of each of the thrust vector control units 16 through a driver 89 for operation of the solenoid-operated valve 52. A rate gyroscope 90 detects an angular velocity on the basis of the degrees of pitching and yawing of the rocket 12 to supply signals to the adder 83. Another gyroscope 91 which may be constituted by a free gyroscope, a rate integration gyroscope or the like detects the angles of the pitching and yawing of the rocket 12 to supply signals to the adder 82.

Operation of the apparatus thus constructed will be described hereinafter.

When a small degree of disturbance is acting upon the rocket 12 on flight, the attitude of the rocket 12 is varied. The variation in the attitude of the rocket 12 is detected by the rate gyroscope 90 and the free gyroscope 91, which deliver respective signals to the adders 83 and 82. The adders 82 and 83 then add the signals from the rate gyroscope 90 and the free gyroscope 91 and the control reference signals from the programmer 81 to supply error signals to the integrator 87 and the coefficient generator 84. The signals delivered to the coefficient generator 84 are corrected for proper coefficient and are transmitted through the servo-amplifier 85 to the mode selector 86 where the amount of the fluid to be injected is determined. The output signals of the mode selector 86 are fed to the servo valve 61 of each of the thrust vector control units 16 so that fluid is directed into the compartment 60a through the fluid passageway 62 and is discharged from the compartment 60b through the fluid passageway 63. As a result, the inner piston 59 is moved away from the thrust nozzle 14 together with the stem 64, whereupon the position detector 78 detects the axial position of the inner piston 59 to transmit detection signals to the mode selector 86 through a suitable feedback circuit (not shown). The movement of the inner piston 59 causes the valve head 57 to open with an annular gap between the conical face of the valve head 57 and the inner end of the outlet port 43 remote from the thrust nozzle 14. The annular gap corresponds to the error signals of the adder 83 so that the fluid is adjusted in amount and is injected from the injecting bore 18 of the fluid injecting nozzle 17 through the fluid passageway 44. At this time, the error signals fed into the integrator 87 are integrated to deliver an integration signal to the comparator 88 where the value of the integration signal of the integrator 87 and the estimated value of the comparator 88 are compared but the comparator 88 can not deliver operational signals to the driver 89 since the value of the integration signal of the integrator 87 is smaller than the estimated value of the comparator 88 so that the fluid injecting nozzle 17 is not permitted to project into the thrust nozzle 14. Therefore, the stream of the combustion gas passing through the thrust nozzle 14 is disturbed and the attitude of the rocket 12 is thus controlled as in a conventional secondary jet type apparatus. When the attitude of the rocket 12 is corrected, no error signal is issued from the adder 83. At this time, fluid is fed into the compartment 60b through the fluid passageway 63 and is discharged from the compartment 60a through the fluid passageway 62 by the action of the servo valve 61. The valve head 57 is thus moved into the position closing the outlet port 43.

On the other hand, when a relatively large degree of disturbance is acting upon the rocket 12, the variation in the attitude of the rocket 12 is detected by the rate gyroscope 90 and the free gyroscope 91, which deliver respective signals to the adders 83 and 82 in a similar manner. The adder 82 and 83 then add the signals from the rate gyroscope 90 and the free gyroscope 91 and the control reference signals from the programmer 81 to deliver error signals to the integrator 87 and the coefficient generator 84. The error signals supplied to the integrator 87 are successively integrated to delivery an integration signal to the comparator 88 where the value of the integration signal of the integrator 87 and the estimated value of the comparator 88 are compared with each other. The comparator 88 feeds the operational signals to the solenoid-operated valve 52 of each of the thrust vector control units 16 through the driver 89 since the value of the integration signal of the intergrator 87 is larger than the estimated value of the comparator 88. When the solenoid-operated valve 52 receives an operational signal from the comparator 88, the solenoid coil 54 of the solenoid-operated valve 52 is energized to move the push rod 73 toward the second cylinder compartment 26b of the cylinder chamber 26 so that the spherical valve member 51 is moved to close the second control passageway 47. The first cylinder compartment 26a is thus vented to the open air through the first and third control passageways 46 and 48 to decrease the pressure of the fluid in the first cylinder compartment 26a. As a result, the outer piston 29 is moved toward the thrust nozzle 14 to cause the fluid injecting nozzle 17 to project into the thrust nozzle 14 as the fluid is at all times supplied to the second cylinder compartment 26b from the fluid reservoir 39.

On the other hand, the error signals supplied to the coefficient generator 84 are passed through the servo-amplifier 85 to the mode selector 86 which simultaneously receives a signal from the comparator 88 so that the mode selector 86 feeds to the servo valve 61 of each of the thrust vector control units 16 mode signals different from the preceding mode signals. The servo valve 61 is thus operated to open the valve head 57 with a small annular gap between the conical face of the valve head 57 and the inner end of the outlet port 43 remote from the thrust nozzle 14. A small amount of fluid is injected from the injecting bore 18 of the fluid injecting nozzle 17 to cool the fluid injecting nozzle 17 by the fluid passing through the injecting bore 18 so that the fluid injecting nozzle 17 is prevented from being heated to an extremely high temperature although it is exposed to the hot combustion gas in the thrust nozzle 14. The forward movement of the fluid injecting nozzle 17 into the thrust nozzle 14 causes the stream of the combustion gas passing through the thrust nozzle 14 to be disturbed so that the attitude of the rocket 12 is corrected for proper direction. Once the attitude of the rocket 12 is corrected, no error signal is delivered from the adders 82 and 83, with the result that no signal is issued from the comparator 88. The solenoid coil 54 of the solenoid-operated valve 52 is de-energized to cause the push rod 53 to retract away from the valve chamber 50 so that the spherical valve member 51 closes the third control passageway 48. The first control passageway 46 is thus brought into communication with the second control passageway 47 to allow the fluid to be supplied from the second cylinder compartment 26b to the first cylinder compartment 26a through the second control passageway 47, the valve chamber 50 and the first control passageway 46 so that the outer piston 29 is moved away from the thrust nozzle 14 to permit the fluid injecting nozzle 17 to resume its initial position shown in FIG. 2.

According to the rocket attitude control apparatus of the present invention as described above, the attitude of the rocket can be properly controlled against any degree of disturbance of air. Moreover, it is extremely easy to select the metal material of the fluid injecting nozzle since the fluid injecting nozzle can be cooled by the fluid passing therethrough when the fluid injecting nozzle is held projected inwardly of the thrust nozzle.

Although the particular embodiment of the present invention has been shown and described, it will be obvious to those skilled in the art that various changes and modifications may be made without departing from the spirit and scope of the present invention.

What is claimed is:

1. A rocket attitude control apparatus for controlling the attitude of a rocket including a rocket fuselage and a thrust nozzle integrally attached to the rear end of said rocket fuselage and having a nozzle throat located longitudinally intermediate thereof, said apparatus comprising a plurality of thrust vector control units disposed at the outer periphery of said thrust nozzle between said nozzle throat and the rear end of said thrust nozzle in circumferentially equiangularly spaced relationship to each other, and each including a fluid injecting nozzle projectable inwardly of said thrust nozzle and having an injecting bore therein, a casing accommodating said fluid injecting nozzle therein, reciprocating means for projecting and retracting said fluid injecting nozzle into and out of said thrust nozzle, a fluid reservoir for reserving fluid to be injected from said injecting bore of said fluid injecting nozzle, a fluid passageway leading from said fluid reservoir to said injecting bore of said fluid injecting nozzle, valve means disposed in said fluid passageway for controlling the amount of said fluid passing therethrough to said injecting bore from said fluid reservoir, and valve operating means for closing and opening said valve means, said casing comprising a stationary cylinder having an end wall in which is formed a cylinder bore in coaxial relationship to said injecting bore of said fluid injecting nozzle, a plug closing said stationary cylinder at the axially outer end thereof to define a cylinder chamber and having a cylindrical body portion projecting toward said thrust nozzle and into said cylinder chamber, and a guide member secured to said plug to extend into said cylinder chamber from the end wall portion of said plug and radially spaced apart inwardly from said cylindrical body portion of said plug; and wherein said reciprocating means comprises an outer piston including a piston member integrally formed with said fluid injecting nozzle and slidably housed in said stationary cylinder to divide said cylinder chamber into a first compartment adjacent to said thrust nozzle and a second cylinder compartment remote from said thrust nozzle and a cylindrical body portion in slidable engagement with said guide member and said cylindrical body portion of said plug.

2. A rocket attitude control apparatus as defined in claim 1, wherein said reciprocating means further comprises a first control passageway formed in said stationary cylinder of said casing and leading into said first cylinder compartment, a second control passageway formed in said stationary cylinder of said casing and leading into said second cylinder compartment, a third control passageway formed in said stationary cylinder of said casing to be vented to the open air, and a valve assembly for selectively providing and blocking the communication between said first and second control passageways and between said first and third control passageway.

3. A rocket attitude control apparatus as defined in claim 2, wherein said valve assembly of said reciprocating means includes a valve chamber formed in said stationary cylinder of said casing and disposed to associate with all of said first, second and third control passageways, a spherical valve member freely movably housed in said valve chamber to selectively provide and block the communication between said first and second control passageways and between said first and third control passageways, and a solenoid-operated valve for moving said spherical valve member toward and away from said second cylinder compartment of said cylinder chamber to close said third control passageway when said first control passageway is held in communication with said second control passageway and to close said second control passageway when said first control passageway is held in communication with said third control passageway.

4. A rocket attitude control apparatus as defined in claim 3, wherein said solenoid-operated valve of said valve assembly includes a push rod projectable into and retractable from said valve chamber to move said spherical valve member toward and away from said second cylinder compartment of said cylinder chamber, and a solenoid coil mounted on said stationary cylinder of said casing to project said push rod upon its energization and to retract said push rod upon its de-energization.

5. A rocket attitude control apparatus as defined in claim 1, wherein said second cylinder compartment of said cylinder chamber is in communication with said fluid reservoir; and wherein said fluid passageway comprises a slot formed in said cylindrical body portion of said outer piston in communication with said second cylinder compartment of said cylinder chamber, a valve cavity formed in said guide member, an inlet port formed in said guide member to provide communication between said slot and said valve cavity, and an outlet port formed in said guide member to provide communication between said valve cavity and said injecting bore of said fluid injecting nozzle; and wherein said valve means is accommodated in said valve cavity to open and close said outlet port.

6. A rocket attitude control apparatus as defined in claim 5, wherein said valve means comprises a tapered valve head.

7. A rocket attitude control apparatus as defined in claim 6, wherein said valve operating means comprises a cylinder concavity defined by said guide member and said plug of said casing, an inner piston slidably received in said cylinder concavity to divide said cylinder concavity into two separate compartments, a stem connecting said valve head and said inner piston, and a servo valve communicating with said compartments to deliver and discharge fluid to and from said compartments so that said valve head is moved to open and close said outlet port of said fluid passageway.

8. A rocket attitude control apparatus as defined in claim 7, wherein said valve operating means further comprises a position detector which detects the axial position of said valve head with respect to said guide member.

9. A rocket attitude control apparatus as defined in claim 8, wherein said position detector comprises a solenoid coil provided in a chamber defined by said plug and said inner piston, and a solenoid plunger secured to said inner piston and slidably received in said solenoid coil.

10. A rocket attitude control apparatus as defined in claim 7, which further comprises a control circuit including a programmer successively supplying control reference signals first and second adders on the basis of a predetermined program for the attitude of said rocket on flight, a coefficient generator calculating a correction coefficient on the basis of signals from said second adder to deliver signals to a servo-amplifier, a mode selector determining a mode of operation on the basis of the signals passed through said servo-amplifier to transmit mode signals to said servo valve of each of said thrust vector control units and to adjust the amount of fluid to be ejected from the fluid ejecting nozzle, an integrator receiving and integrating the signals from said second adder, a comparator comparing the output signals from said integrator with an estimated value of disturbance to output signals to said solenoid-operated valve of each of said thrust vector control units through a driver, a first gyroscope detecting an angular velocity on the basis of the degrees of pitching and yawing of said rocket to supply signals to said second adder, and a second gyroscope detecting the angles of said pitching and yawing of said rocket to supply signals to said first adder.

11. A rocket attitude control apparatus as defined in claim 10, wherein said first gyroscope is a rate gyroscope and said second gyroscope is a free gyroscope.

* * * * *